US008494564B2

(12) United States Patent
Narayan et al.

(10) Patent No.: US 8,494,564 B2
(45) Date of Patent: *Jul. 23, 2013

(54) GPS DRIVEN ARCHITECTURE FOR DELIVERY OF LOCATION BASED MULTIMEDIA AND METHOD OF USE

(75) Inventors: Pramodh D. Narayan, Naperville, IL (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,401

(22) Filed: Mar. 28, 2012

(65) Prior Publication Data

US 2012/0190328 A1 Jul. 26, 2012

Related U.S. Application Data

(63) Continuation of application No. 12/264,616, filed on Nov. 4, 2008.

(51) Int. Cl.
*H04W 24/00* (2009.01)

(52) U.S. Cl.
USPC .................. 455/456.3; 455/414.2; 455/414.3; 455/456.1

(58) Field of Classification Search
USPC ............ 340/995.24; 455/414.1, 414.2, 414.3, 455/456.1, 456.2, 456.3, 457; 701/207, 208
See application file for complete search history.

(56) References Cited

U.S. PATENT DOCUMENTS

| 6,282,362 | B1 | 8/2001 | Murphy et al. | |
|---|---|---|---|---|
| 6,522,875 | B1 | 2/2003 | Dowling et al. | |
| 6,731,940 | B1 | 5/2004 | Nagendran | |
| 6,879,838 | B2* | 4/2005 | Rankin et al. | 455/456.6 |
| 6,906,643 | B2 | 6/2005 | Samadani et al. | |
| 7,133,685 | B2* | 11/2006 | Hose et al. | 455/456.1 |
| 7,167,907 | B2 | 1/2007 | Shaffer et al. | |
| 7,644,400 | B2* | 1/2010 | Harris et al. | 717/136 |
| 7,787,887 | B2* | 8/2010 | Gupta et al. | 455/456.1 |
| 7,840,224 | B2 | 11/2010 | Vengroff et al. | |
| 7,848,765 | B2 | 12/2010 | Phillips et al. | |
| 7,890,124 | B2* | 2/2011 | Smith et al. | 455/456.3 |
| 2005/0245241 | A1 | 11/2005 | Durand et al. | |
| 2008/0031194 | A1 | 2/2008 | Yaqub | |

(Continued)

OTHER PUBLICATIONS

Munson et al. "Location-Based Notification as a General-Purpose Service", WMC '02, Sep. 28, 2002, pp. 40-44.

(Continued)

*Primary Examiner* — Anthony Addy
*Assistant Examiner* — Michael S Bush
(74) *Attorney, Agent, or Firm* — Matthew Chung; Roberts Mlotkowski Safran & Cole, P.C.

(57) ABSTRACT

An architecture, system and method of use sends location based multimedia to participants of a geo-tour or other application using geo-boundaries and/or other location information. The method includes detecting when a user has crossed within a geo-boundary. The method further includes determining a content type to be sent to a mobile device based on preferences provided by the user. Additionally, the method includes sending user location specific content of the determined content type to the mobile device when the user has crossed within the geo-boundary.

12 Claims, 4 Drawing Sheets

U.S. PATENT DOCUMENTS

| | | | |
|---|---|---|---|
| 2008/0119203 A1* | 5/2008 | Shalmon et al. | 455/456.2 |
| 2008/0183485 A1* | 7/2008 | Drabble et al. | 705/1 |
| 2008/0312946 A1* | 12/2008 | Valentine et al. | 705/1 |
| 2010/0113065 A1* | 5/2010 | Narayan et al. | 455/456.3 |

OTHER PUBLICATIONS

Notice of Allowance for U.S. Appl. No. 12/264,616 dated Jun. 21, 2012.

* cited by examiner

GPS DRIVEN ARCHITECTURE FOR DELIVERY OF LOCATION BASED MULTIMEDIA AND METHOD OF USE

CROSS REFERENCE TO RELATED APPLICATIONS

The present application is a continuation application of co-pending U.S. application Ser. No. 12/264,616, filed on Nov. 4, 2008, the contents of which are incorporated by reference in its entirety herein.

FIELD OF THE INVENTION

The invention generally relates to an architecture and method of use for providing location based multimedia to participants and, in particular, to an architecture and method of use for providing location based multimedia to participants of a geo-tour or other application using geo-boundaries and/or other location information.

BACKGROUND

Faced with an increasingly difficult challenge in growing both average revenue per user (ARPU) and numbers of subscribers, wireless carriers are trying to develop a host of new products, services, and business models based on data services. One such service is location services, which provide information specific to a location including actual locations of a user. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:

Providing the nearest business or service, such as an ATM or restaurant;
Providing alerts, such as notification of a sale on gas or warning of a traffic jam; and
Providing weather reports which are germane to the location where the user is using the mobile device, etc.

For the network carrier, location-based services provide value add by enabling services such as:

Resource tracking with dynamic distribution (e.g., taxis, service people, rental equipment, doctors, fleet scheduling, etc.);
Finding people or information for the user (e.g., person by skill (doctor), business directory, navigation, weather, traffic, room schedules, stolen phone, emergency 911);
Proximity-based notification (push or pull) (e.g., targeted advertising, buddy list, common profile matching (dating), automatic airport check-in); and
Proximity-based actuation (push or pull) (e.g., payment based upon proximity (EZ pass, toll watch).

Two methods are commonly in use to determine the location of a wireless device with a third method starting to become more popular. However, the methods do not adequately address many of the issues required to provide services. These methods include signal strength of cell towers that are near the wireless device (e.g., triangulation); GPS triangulation; and exposing the LBS as a web service.

The first method determines a wireless device's location by comparing the signal strength of cell towers that are near the wireless device. This method is called triangulation and is substantially the same method that GPS devices use to determine their location. The difference between cell triangulation and GPS triangulation, though, is the signals they use to determine location. The second method, GPS triangulation, uses satellites to determine a device location. In either case, the latitude and longitude are kept in the infrastructure of the location services.

Another method includes creating location based services by exposing the LBS as a web service. For example, when a device wants an update from the location-based system, it sends a request with the proper authentication credentials and a unique identifier that describes the device that is being tracked. The LBS returns the coordinates of the device being queried.

SUMMARY

In a first aspect of the invention, a method comprises detecting when a user has crossed within a geo-boundary. The method further comprises determining a content type to be sent to a mobile device of the user based on preferences provided by the user. Additionally, the method comprises sending user location specific content of the determined content type to the mobile device when the user has crossed within the geo-boundary.

In another aspect of the invention, a computer program product comprising a computer usable storage medium having readable program code tangibly embodied in the medium is provided. The computer program product comprises: first program instructions to receive preference information of a mobile device; second program instructions to receive a notification when the mobile device has crossed within a geo-boundary; third program instructions to check capabilities of the mobile device and transform location specific content to be compatible with the mobile device based on the checked capabilities; and fourth program instructions to send the location specific and compatible content to the mobile device based on the preference information and the check. The location specific and compatible content is associated with a detected location of the mobile device within the geo-boundary.

In another aspect of the invention, a method is provided for sending location information to one or more mobile devices. The method comprises providing a computer infrastructure being operable to: receive and store preference information of a mobile device; check content compatibility of the mobile device with content specific to a location of the mobile device; transform the content specific to the location of the mobile device when not compatible with the mobile device; and send the content specific to the location of the mobile device to the mobile device when the mobile device is detected to have crossed within a geo-boundary.

In yet another aspect of the invention, a system comprises a management system configured to register one or more mobile devices with a location based service and further configured to obtain and store preferences and other information related to the one or more mobile devices. The system further comprises a media service configured to be notified of the preferences so as to provide relevant location based content to the one or more mobile devices when any of the one or more mobile devices cross within a defined geo-boundary. The media service is further configured to perform transformations of the content so as to be compatible with the one or more mobile devices.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
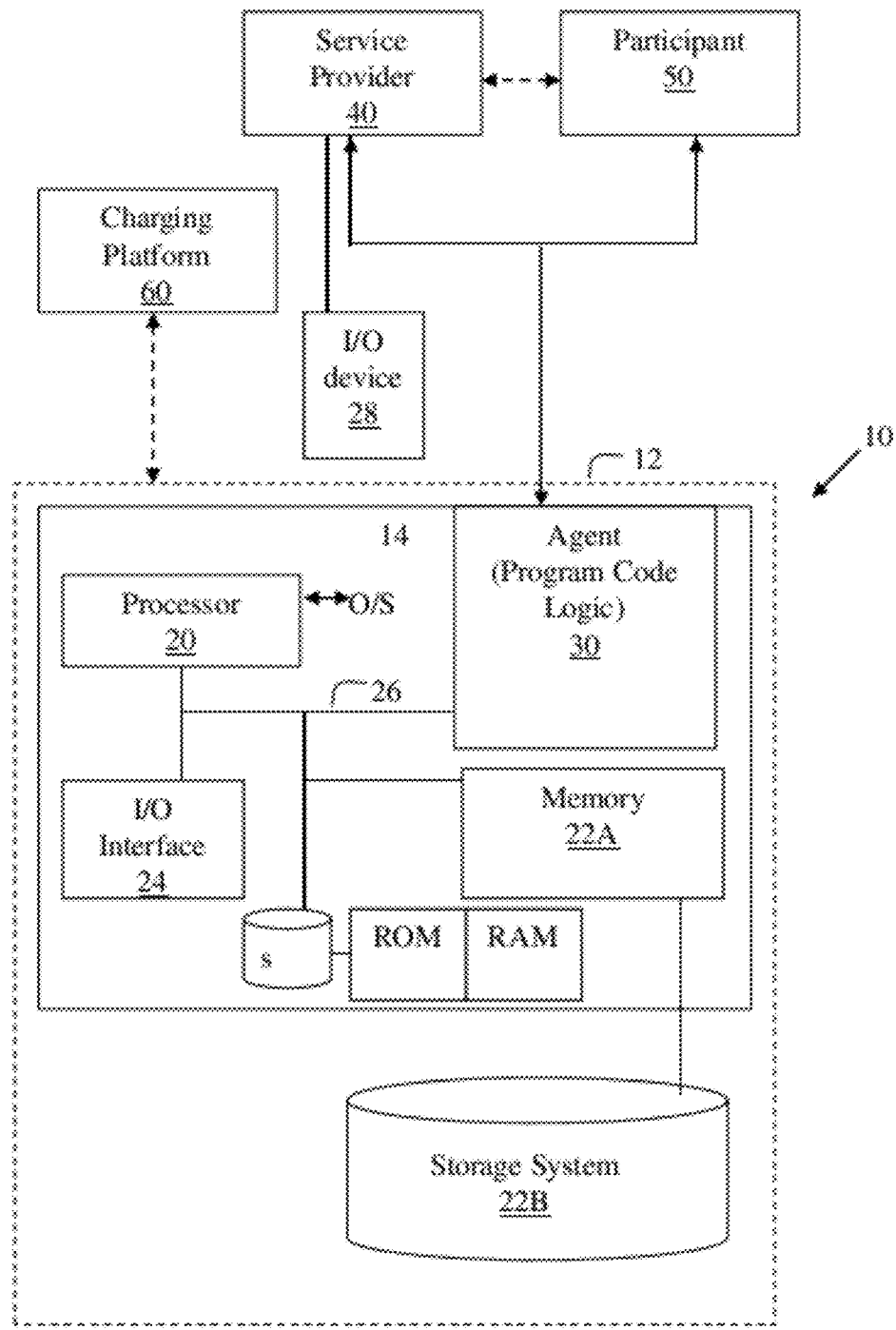
FIG. 1 shows an illustrative environment for implementing processes in accordance with the invention.

The invention generally relates to an architecture and method of use for providing location based multimedia to participants and, in particular, to an architecture and method of use for providing location based multimedia to participants of a geo-tour or other application using geo-boundaries and/or other location information. More specifically, the system and method of the present invention uses geographic boundaries (geo-boundaries) in order to determine a position of a participant and, based on this positional information, provide relevant information to the participant, e.g., content, related to places or objects of interest, such as, for example, monuments, historical places, etc. The location of the participant can be obtained from GPS, A-GPS, or triangulation methodologies, all of which are known to those of skill in the art such that further explanation is not required herein. The location information can include a radius of the geo-boundary.

In embodiments, the content can be any type of content (multimedia). The content can be, for example, audio, text, streaming video, graphics, etc., any of which is dynamically provided to the participant and relevant to the location of the participant. The content can be sent to a plurality of different users based on their location, i.e., triggered by entering within a geo-boundary. The content can also be sent to different devices such as, for example, a portable digital assistant (PDA), cellular telephone, laptop computer or any other type of mobile device, set by preferences of the participant. Accordingly, the system and method of the present invention is device agnostic, i.e., any device can be configured to work with the architecture of the present invention.

The content can be sent to the participants by SMS, Session Initiation Protocol (SIP), Microsoft Media Server (MMS), Simple Mail Transfer Protocol (SMTP), Web Services, Rich Site Summary (RSS) feeds (also referred to as Really Simple Syndication (RSS 2.0)", "RDF Site Summary (RSS 1.0 and RSS 0.90)", or "Rich Site Summary (RSS 0.91)) or ATOM feeds. The formatting of the content and type of content can be determined dynamically based on registration information and real time transformations. In embodiments, a service provider, e.g., network carrier, content provider or other third party service provider, etc. can provide the content to the participant.

Also, in embodiments, as the content can be stored on a central storage system, it is advantageously possible to update any information, once, and stream this information to the participant. In this way, when facts or other information need to be updated, changed or added, there is no need to update each individual device, as the user's device is not a "dedicated" device. Instead, a single update to the single storage system would suffice.

In operation, the participant can register with a "GeoTour" application provided by, e.g., a service provider, location based service, content provider, etc. The application can be linked with a location based service provided by the same service provider or a network carrier, for example. The participant can register for different types of notifications and different types of content based on specific rules. For example, the participant can be notified about historical events, places, etc., upon the occurrence of entering a particular geographic area bounded by a latitude and longitude and a radius. The service can stop when the participant leaves the geographic area.

The signal provided by the participant's mobile device to the service provider, e.g., network carrier, may be, for example a wireless application protocol (WAP). Those of skill should recognize that WAP is an international standard for applications that uses wireless communications. WAP's principal application is to enable access to the Internet from a mobile phone or PDA (e.g., handheld device). A WAP browser provides all of the basic services of a computer based web browser but simplified to operate within the restrictions of the handheld device. Those of skill in the art should also appreciate that the present invention is not limited to WAP applications, but may be implemented using any wireless data protocol such as, for example, the Japanese i-mode system.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- a portable computer diskette,
- a hard disk,
- a random access memory (RAM),
- a read-only memory (ROM),
- an erasable programmable read-only memory (EPROM or Flash memory),
- a portable compact disc read-only memory (CDROM), and/or
- an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server 12 that can perform the processes described herein. In particular, the server 12 includes a computing device 14. The computing device 14 can be resident on a carrier network infrastructure, a message server, content provider server, or other third party service provider (any of which is generally represented in FIG. 1).

The computing device 14 includes an Agent 30 (module or program control) configured to make computing device 14 operable to perform the services described herein. The implementation of the Agent 30 provides an efficient way in which a service provider 40 (e.g., a content provider, tour organization, network carrier, etc.) can send content to a participant 50 at certain locations. In embodiments, the service provider 40 can be responsible for the implementation, upkeep, etc. of the computing device, as discussed further below. The Agent 30 can be one or more computing modules, representing each of the modules or "players" discussed with reference to FIGS. 1-4, and can be implemented by a service provider such as, for example, a network carrier, content provider, etc. By using this system and methodology, the network carrier will not have to make any significant infrastructure investments, as the preexisting infrastructure is utilized with the present invention.

By way of illustration, the Agent 30 will receive registration information from the participant 50. The registration information can include, for example, certain rules, identification information, etc. The rules can be, for example, the type of content to be received (compatible with the device) by the participant such as, for example, audio, text, streaming video or graphics, to name a few. The rules or other information can also set-up particular geo-boundaries or request specific tours. The geo-boundaries of a particular tour, though, are preferably set up by the service provider, content provider, etc. responsible for the tours. The participant 50 can also enter contact information such as, for example, an email address or user ID, as well as preferred message types. The message types can be sent by SMS, SIP, SMTP, Web Services, RSS feed or ATOM based feed, for example. The rules and other information can be stored in the storage system 22B.

Upon registering with the Agent 30, the location of the participant can be provided to the service provider, content provider, etc., which can be obtained directly from the participant 50 or through a location based platform. The location based platform can be a separate entity such as, for example, provided by a network carrier. In embodiments, upon a triggering event, e.g., the participant 50 entering a certain geo-boundary, the Agent 30 (by way of a media service shown in FIG. 3) will provide content to the participant 50 in the requested format, relevant to the location of the participant. In embodiments, the Agent 30 will transform the content, e.g., format the content, to ensure that it is compatible with the device of the participant. For example, the Agent 30 can check the user's device preferences to ensure the device is capable of the message or other media that the system may send, e.g., 640×428 pixel format. If the device is not capable of receive multimedia, the Agent 30 can send a text message via SMS, which may include a URL of a tour. Also, in embodiments, as the system is dynamic, the Agent can change the information based on the movements of the participant. A participant's device can transmit its location to the Agent 30 using, for example, GPS, A-GPS or triangulation methodologies.

In embodiments, a charging platform 60 is maintained to provide charging models to charge for services rendered. The charging platform 60 may be maintained, deployed, created and/or serviced by the service provider. The charging platform 60 is designed to generate a charging record for services rendered to a subscriber, e.g., the participant will be charged for the services rendered based on the charging model implemented by the system and method of the invention. In embodiments, the service provider and/or Agent 30 can calculate an amount to be charged, based on many different considerations and generate the charging record to be sent to the charging platform 60. In turn, the charging platform 60 can generate an invoice and/or deduct a usage charge from an account of the subscriber.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or LBS, could offer to perform the processes described herein. In this case, the service provider can create, maintain, deploy, support, etc., the computer infrastructure that performs the process steps of the invention for one or more customers. The participants may be, for example, a user of a mobile device. In return, the service provider can receive payment from the customer(s) and/or participants under a subscription and/or fee agreement and/or the service provider can receive payment from the sale of advertising content to one or more third parties.

Exemplary Geo-Boundary

Figure 2:
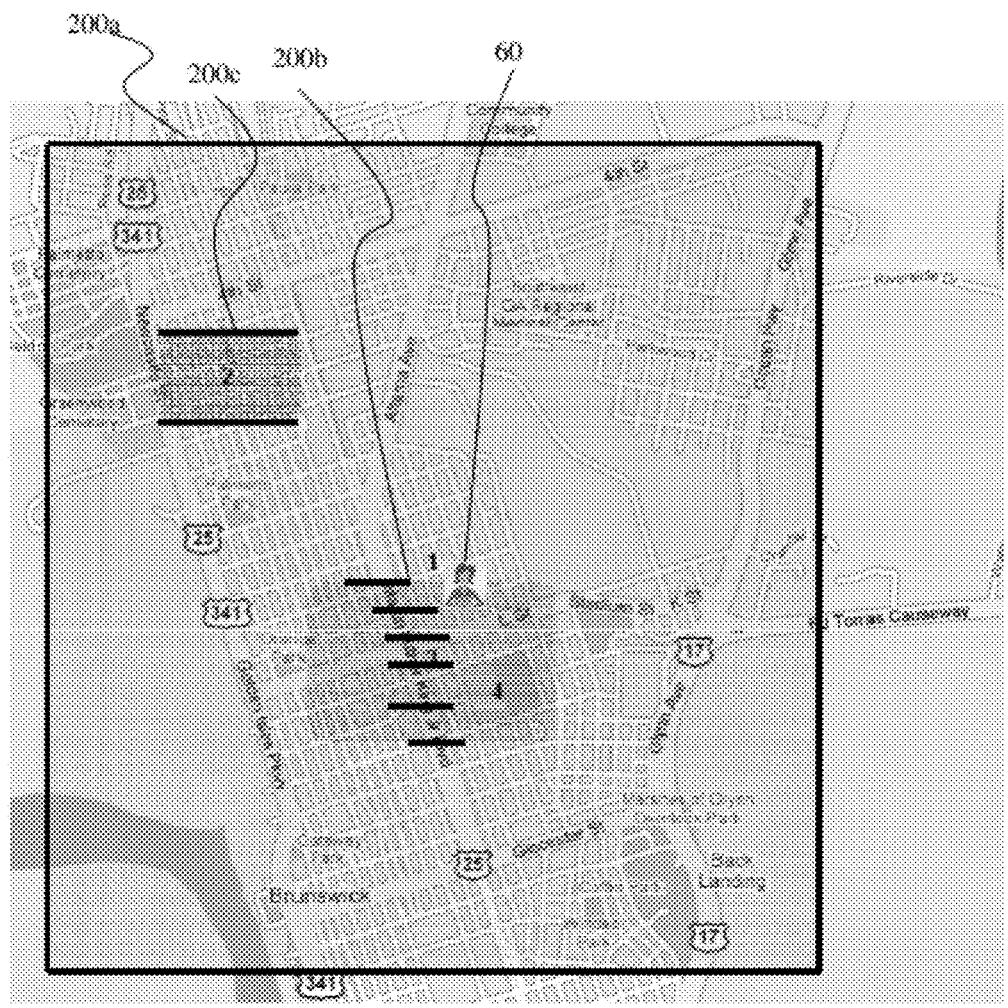
FIG. 2 shows a representative map with geo-boundaries in accordance with aspects of the present invention.

FIG. 2 shows a representative map with geo-boundaries in accordance with aspects of the present invention. In particular, the map of FIG. 2 shows a plurality of rectangular geo-boundaries 200a, 200b and 200c. The rectangular geo-boundaries 200a, 200b and 200c may bound, for example, a historical district, walking tour, etc. In alternative embodiments, the geo-boundaries 200a, 200b and 200c can be aligned with other boundaries such as roads, geographic features of the landscape or buildings, to name a few. In embodiments, the plurality of geo-boundaries 200a, 200b and 200c can be nested together (a boundary within a boundary as shown in FIG. 2) or remote from one another (as shown at 200b and 200c of FIG. 2), depending on the specific configuration.

In embodiments, the geo-boundaries 200a, 200b and 200c can be set up by the service provider, content provider or other entity. For example, in the scenario of a tour, a historical preservation society, governmental entity or tour guide organization can set up the geo-boundary to correspond with sites of historical importance or interest. The historical preservation society, governmental entity or tour guide organization can also populate the storage system 22B or other database with relevant information related to buildings, monuments, or other points of interest within the geo-boundary. In embodiments, the information can be updated periodically in order to change, add or otherwise modify the information as new information becomes available. Also, the information can be updated in order to refresh or reorganize the information to make it interesting for repeat participants. Advantageously, as the mobile devices of the participants are independent of the system of the invention, there is no need to make updates to individual, dedicated devices.

As noted above, the information can be provided to the participant 50 based on the location of the participant within the geo-boundary. Once the participant 50 registers and enters the geo-boundary, content can be provided to the mobile device of the participant. The content can be provided based on the rules provided by the participant. In implementation, the service provider such as the historical preservation society, governmental entity or tour guide organization can check the participant's mobile device to determine the type of content and, using this information, can transform the content, e.g., format the content, in order to be compatible with the participant's mobile device. This can be accomplished by making a service call to a device management server that uses a User Agent Profile (UAProf) specification. For example, the UAProf captures the capability and preference information for the mobile device and uses this information to produce content in an appropriate format for the specific mobile device.

Exemplary Architecture

Figure 3:
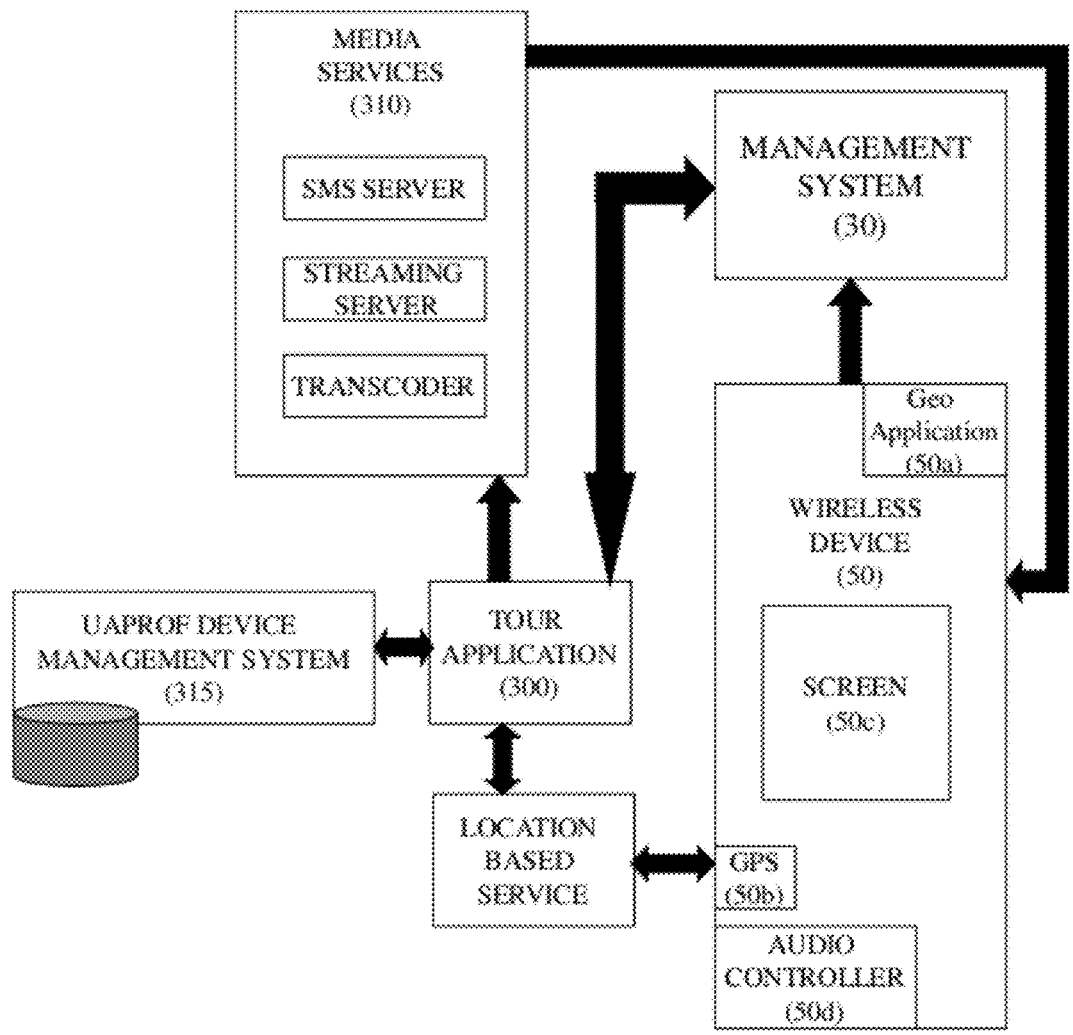
FIG. 3 shows an exemplary architect implementing aspects of the present invention.

FIG. 3 shows an exemplary architect implementing aspects of the present invention. In particular, in the exemplary architect of FIG. 3, a mobile device 50 (e.g., participant) includes a tour application 50a, a GPS 50b, a screen 50c and an audio controller 50d, amongst other known features. The GPS 50b is configured to obtain location information of the mobile device 50. The screen 50c and the audio controller 50d are configured to provide content to the participant. The tour application 50a, on the other hand, is configured to communicate information to a management system 30. In embodiments, the management system 30 can be the Agent shown in FIG. 1.

The management system 30 is configured to register the mobile device 50 with the location based services. The management system 30 is also configured to obtain and store preferences and other information related to the mobile device 50. The preferences can include, for example, the types of content that can be supported on the mobile device such as, for example, audio, video, text, etc. The preferences and other information can also include the type of preferred content to be provided to the mobile device 50, as well as a phone number, unique user ID or other unique identifier of the mobile device 50. In addition, the registration can include subscriptions for specific tours of interest. In embodiments, the mobile device (participant) 50 can register with the management system 30 in order for the management system 30 to obtain such information.

The registered information can be provided to a geo-tour application 300 via the management system 30. In this way, the geo-tour application 300 will be able to determine the mobile device preferences. In embodiments, the geo-tour application 300 will also register with a location based service 305. This allows the geo-tour application 300 to track the mobile device (participant) 50, thereby being able to determine when the mobile device 50 enters or leaves a geo-boundary. That is, the geo-tour application 300 can pass the unique identifier of the mobile device 50 along with the any other necessary information required to sign into the system to the location based service 305 in order to track that particular mobile device 50.

In one illustrative example, upon a triggering event, e.g., the location based service 305 detecting that a participant entered a geo-boundary, the geo-tour application 300 can check the management system 300 for preferences. Once the preferences are checked, a media service 310 can be notified of the preferences so as to provide relevant content to the mobile device 50. The media service 310 includes an SMS server, a streaming server and a transcoder. The transcoder, for example, can perform can capture the capability and preference information for the mobile device 50 and perform on-the-fly (real-time) transformations of the content to format the content to the specific mobile device. In embodiments, a UAProf 315 can capture the capability and preference information for the mobile device 50, supplementing or bypassing the transcoder.

If the content cannot be viewed by the participant because device incompatibility, the media service 310 can send a text message to the mobile device using the SMS server. The text message can reference a URL where the media can be viewed by the participant. It should be understood that the geo-tour application, media services, management services and location based services can be the same or separate entities, depending on a particular desired architecture.

Exemplary Processes

Figure 4:
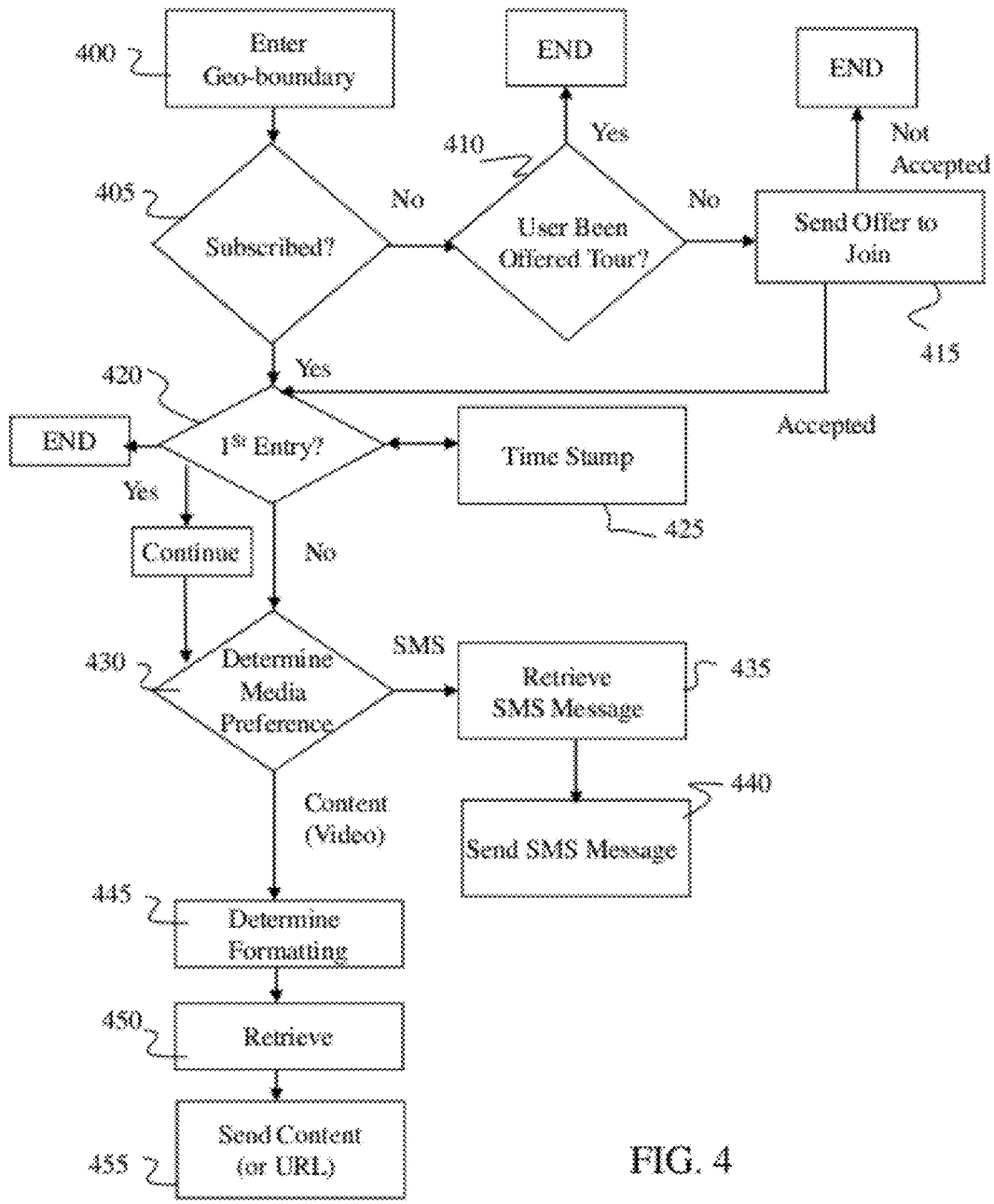
FIG. 4 is a flow diagram showing a boundary message process in accordance with aspects of the present invention.

FIG. 4 illustrates exemplary processes in accordance with the present invention. The steps of FIG. 4 may be implemented on the computer infrastructure of FIG. 1 and/or the architecture of FIG. 3, for example. The flow diagram in FIG. 4 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagram, and combination of the flow diagram can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1 and/or architecture of FIG. 3. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

More specifically, FIG. 4 is a flow diagram showing a boundary message process in accordance with aspects of the present invention. At step 400, one or more geo-boundaries are set by, for example, a service provider. The service provider can be, for example, a location based system, network carrier, content provider, tour operator, etc., and the boundaries can be set in the manner described above. At step 405, upon entry of a geo-boundary, a determination is made as to whether a user of a mobile device is a subscriber to the geo-boundary service. The user location can be determined by, for example, GPS, A-GPS or triangulation methodologies.

If the mobile device is not a subscriber, at step 410, a determination is made as to whether the user has been offered a tour (e.g., offered to join the subscribed service) within a predetermined time period, e.g., 24 hours. If no, at step 415, an offer to join the service is provided to the user of the mobile device, possibly already detected within the geo-boundary. If the user does not accept the offer, the process ends. If the user has been offered a tour (e.g., offered to join the subscribed service) within the predetermined time period, the process will also end.

If the user accepts the offer (and registers) at step 415 or is already subscribed to the service at step 405, the process continues to step 420. At step 420, a determination is made as to whether the participant has previously entered the geo-boundary within a predetermined time period, e.g., within 24 hours. The time period can be determined by a time stamp at step 425. If the participant entered the geo-boundary within a predetermined time period, the process can provide the participant with the option to end the process or continue the process.

If the participant has not previously entered the geo-boundary within the predetermined time period or has elected to continue the process, at step 430, a determination is made as to the media preference of the participant. This can be obtained dynamically, in real time, from the management system, for example. If the preference is text, the process retrieves an SMS message for the current geo-boundary at step 435. At step 440, the SMS message is sent to the participant. If the preference is content (e.g., audio, streaming video or graphics), at step 445, the process will determine the correct formatting or other capabilities, e.g., video formatting, based on a service call to a UAProf specification or the device management service (transcoder). At step 450, the content will be retrieved and, at step 455, the content will be sent to the participant. The content can be dynamically updated, periodically, based on the location and/or preferences of the participant.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method comprising:
    detecting when a user has crossed within a geo-boundary;
    determining a content type of user location specific content to be sent to a mobile device of the user based on preferences provided by the user, the content type determined when the user has crossed within the geo-boundary, and the preferences comprising the content type which comprises at least one of text, audio, video and graphics;
    sending the user location specific content of the determined content type to the mobile device when the user has crossed within the geo-boundary;
    determining whether the user is subscribed to a geo-boundary service when the user has crossed within the geo-boundary;
    determining whether the user has been offered to join the geo-boundary service within a predetermined time period when the user is not subscribed to the geo-boundary service;
    providing the user an offer to join the geo-boundary service when the user has not been offered to join the geo-boundary service within the predetermined time period;
    comprising receiving registration information of the user including the preferences, unique identification of the mobile device and subscription information for at least one tour within the geo-boundary;
    charging the user for the location specific content;
    determining whether the user has previously crossed within the geo-boundary within another predetermined time period based on a time stamp when the user has crossed within the geo-boundary;
    providing the user with an option to continue the geo-boundary service when the user has previously crossed within the geo-boundary within the another predetermined time period;
    determining the content type when the user has not previously crossed within the geo-boundary within the another predetermined time period and the user has elected the option to continue the geo-boundary service.

2. The method of claim 1, further comprising:
    storing the location specific content on a central storage unit, independent of the mobile device; and
    periodically updating or modifying the location specific content, independent of the mobile device.

3. The method of claim 1, further comprising:
    checking capabilities of the mobile device and transforming the location specific content to be compatible with the mobile device based on the checked capabilities; and
    sending a text message to the mobile device when the location specific content cannot be supported on the mobile device.

4. A computer program product comprising a tangible computer usable storage device having readable program code tangibly embodied in the storage device, the computer program product comprising:
    first program instructions to receive preference information of a mobile device;
    second program instructions to receive a notification when the mobile device has crossed within a geo-boundary;
    third program instructions to determine a content type of location specific content to be sent to the mobile device based on the preference information, the content type determined when the mobile device has crossed within the geo-boundary, and the preference information comprising the content type which comprises at least one of text, audio, video and graphics;
    fourth program instructions to check capabilities of the mobile device and transform the location specific content to be compatible with the mobile device based on the checked capabilities;
    fifth program instructions to send the location specific and compatible content to the mobile device based on the preference information and the check, the location specific and compatible content being associated with a detected location of the mobile device within the geo-boundary;
    sixth program instructions to determine whether the mobile device is subscribed to a geo-boundary service when the mobile device has crossed within the geo-boundary;
    seventh program instructions to determine whether the mobile device has been offered to join the geo-boundary service within a predetermined time period when the mobile device is not subscribed to the geo-boundary service;
    eighth program instructions to provide the mobile device an offer to join the geo-boundary service when the mobile device has not been offered to join the geo-boundary service within the predetermined time period;
    ninth program instructions to determine whether the mobile device has previously crossed within the geo-boundary within another predetermined time period based on a time stamp when the mobile device has crossed within the geo-boundary; and
    tenth program instructions to provide the mobile device with an option to continue the geo-boundary service when the mobile device has previously crossed within the geo-boundary within the another predetermined time period.

5. The computer program product of claim 4, further comprising eleventh program instructions to store the content on a central storage unit.

6. The computer program product of claim 4, further comprising eleventh program instructions to send a text message to the mobile device when the content cannot be supported on the mobile device.

7. The computer program product of claim 4, further comprising eleventh program instructions to receive registration information of a user including the preference information, unique identification of the mobile device and subscription information for at least one tour within the geo-boundary.

8. The computer program product of claim 4, further comprising eleventh program instructions to charge a user for the location specific and compatible content.

9. The computer program product of claim 4, further comprising:
    eleventh program instructions to determine the content type when the mobile device has not previously crossed within the geo-boundary within the another predetermined time period and the mobile device has elected the option to continue the geo-boundary service; and twelfth program instructions to periodically update or modify the content, independent of the mobile device.

10. A method for sending location information to one or more mobile devices, comprising:

providing a computer infrastructure being operable to:
receive and store preference information of a mobile device;
determine a content type of content specific to a location of the mobile device, the content to be sent to the mobile device, the content type determined based on the preference information when the mobile device is detected to have crossed within a geo-boundary, and the preference information comprising the content type which comprises at least one of text, audio, video and graphics;
check content compatibility of the mobile device with the content;
transform the content when incompatible with the mobile device;
send the content to the mobile device when the mobile device is detected to have crossed within the geo-boundary;
determine whether the mobile device is subscribed to a geo-boundary service when the mobile device has crossed within the geo-boundary;
determine whether the mobile device has previously crossed within the geo-boundary within a predetermined time period based on a time stamp when the mobile device has crossed within the geo-boundary;
periodically update or modify the content, independent of the mobile device;
send a text message to the mobile device when the content cannot be supported on the mobile device; and
provide the mobile device with an option to continue the geo-boundary service when the mobile device has previously crossed within the geo-boundary within the another predetermined time period.

11. The method of claim 10, wherein the computer infrastructure is further operable to determine whether the mobile device has been offered to join the geo-boundary service within another predetermined time period when the mobile device is not subscribed to the geo-boundary service.

12. The method of claim 11, wherein the computer infrastructure is further operable to provide the mobile device an offer to join the geo-boundary service when the mobile device has not been offered to join the geo-boundary service within the another predetermined time period.

* * * * *